United States Patent

Klein et al.

[15] 3,658,556
[45] Apr. 25, 1972

[54] CANNED JEL DESSERT

[72] Inventors: Ralph Arthur Klein, Liverpool; Angelo Cerchia, Syracuse, both of N.Y.

[73] Assignee: Borden, Inc., New York, N.Y.

[22] Filed: Apr. 28, 1970

[21] Appl. No.: 32,713

[52] U.S. Cl. .................................. 99/131, 99/139, 99/186
[51] Int. Cl. ................................. A23b 7/00, A23l 1/04
[58] Field of Search ........................... 99/182, 186, 139, 131

[56] References Cited

UNITED STATES PATENTS

| | | | |
|---|---|---|---|
| 3,367,783 | 2/1968 | Billerbeck | 99/131 |
| 3,445,243 | 5/1969 | Moirano | 99/131 |
| 3,556,810 | 1/1971 | Moirano | 99/131 |
| 2,700,614 | 1/1955 | Critzman et al. | 99/186 |
| 3,083,547 | 4/1963 | Stevens et al. | 99/182 X |
| 3,342,612 | 9/1967 | Foster et al. | 99/131 |
| 2,794,326 | 6/1957 | Mencacci | 99/186 |

Primary Examiner—S. Leon Bashore
Assistant Examiner—Alfred D. Andrea, Jr.
Attorney—George P. Maskas and Edward L. Mandell

[57] ABSTRACT

This invention relates to an edible gel dessert composition containing fruit particles uniformly distributed therein made by a process which comprises the steps of (a) packaging a dessert mix comprising water, particles of fruit of suitable size and a gelling agent comprising locust bean gum and carrageenan gum in a container and sealing said container; (b) heating the packaged dessert mix to a sterilizing temperature for a sufficient time to effect sterilization; (c) cooling said dessert mix rapidly to a temperature of about 140° to 155° F. within 2 to 5 minutes while concurrently rotating the container; (d) further cooling said dessert mixture to a temperature of about 105° to 115° F. while using a cooling liquid such as water at a temperature of about 100° to 110° F. preferably 105° F. and while concurrently rotating the container along its longitudinal axis for a sufficient time to cause the rotating gel mix to become viscous enough, or so structured, that there is no relative movement or change in position of the fruit particles with respect to each other in the gel without allowing the container walls to be chilled below about 100° to 110° F.; and (e) still further cooling to a temperature below the gel point of the dessert mix.

8 Claims, No Drawings

3,658,556

CANNED JEL DESSERT

BACKGROUND OF THE INVENTION

This invention relates to an edible gel dessert composition and to a method for preparation thereof. More particularly, this invention is directed to edible compositions containing fruit particles uniformly distributed therein.

A widely known and popular class of edible goods comprises gel desert compositions, especially those having fruit particles such as oranges, pears, cherries, grapes, peaches and the like distributed in the gel. Is is customary to prepare these products in a manner so that they are available to the consumer in closed containers, e.g., cans. Closed containers have proved to be the most satisfactory method of providing the consumer with a product which can be readily stored for long periods of time and which can be used immediately when desired without further preparation. Nevertheless, conventional methods for preparing sterilized fruit gel dessert products in closed containers present serious drawbacks, primarily because they have failed to yield dessert gels having the suspended fruit particles uniformly distributed therein. Accordingly, it is an object of the methods and products of this invention to provide for the preparation of a ready-to-use canned dessert fruit gel product, wherein the fruit particles are substantially uniformly distributed and which possesses excellent flavor, gel structure and texture.

DETAILED DESCRIPTION OF THE INVENTION

It has now been found that the above objectives can be achieved for the preparation of a fruit gel by a process which comprises the steps of:

A. Packaging a dessert mix comprising water, particles of fruit of suitable size and a gelling agent comprising locust bean gum and carrageenan gum in a container and sealing said container.

B. Heating the packaged dessert mix to a sterilizing temperature for sufficient time to effect sterilization.

C. Cooling said dessert mix rapidly to a temperature of about 140° to 155° F. While concurrently rotating the container along its longitudinal axis.

D. Further cooling said dessert mixture to a temperature about 105° to 115° F. while using water at a temperature at about 100° to 110° F. and, while concurrently rotating the container along its longitudinal axis for a sufficient time to cause the rotating gel mix to become viscous enough or so structured that there is no relative movement or change in position of the fruit particles with respect to each other in the gel, and E. Still further cooling the dessert mix to a temperature below the gel point while the container is in substantially stationary condition.

Bt the term "dessert mix" is meant an aqueous solution of a gelling agent comprising locust bean gum and carrageenan gum and particles of fruit. In addition thereto, the mix can contain other additives such as sweetening agents, coloring agents, flavoring agents, buffering agents and the like. The nature and proportions of these components will be described hereinafter.

In one aspect, in accordance with the above process, this invention is predicated on the discovery that by employing the critical three-fold temperature gradient cooling stages of steps (C), (D) and (E) above, accompanied by longitudinal rotation of the container in steps (C) and (D), there results a substantially uniform fruit distribution throughout the gel in a gel structure which exhibits no substantial layering or discontinuity. It has been found that any deviation from the above steps, (C), (D) and (E), yields an unsatisfactory product.

In accordance with an illustrative embodiment of the invention; water at 165° to 185° F. is added to gelling agents, flavoring agents, and coloring ingredients with vigorous mixing. The addition of these ingredients will lower the water temperature to about 150° to 160° F. This temperature range was selected because the mix is thin enough to release entrapped air bubbles incorporated during the mixing. At temperatures below 145° F., the mix is too thick to release air bubbles. At temperatures much above 160° F. and long holding the gel system starts breaking down due to the hydrolytic effects of temperature and pH. The mixture is filled into suitable containers, for instance, sanitary type cans, containing fruit pieces, at 150° to 160° F., which are filled as full as practical. The cans are then held in a hot water bath or hot water sprays at 190° F. for about ten minutes. This will result in a can center temperature of 185° F. which is adequate to prevent the growth of any molds, yeasts or bacteria at the dessert pH of about 3.7.

It has been found that it is necessary to rapidly cool the fruit gel composition from the sterilization temperature to a temperature of from about 140° to 155° F. (Step C) followed by additional cooling to the critical temperature range of 105° to 115° F. preferably 110° to 115° F., which is the approximate gelling point of the system (Step D). The rapid cooling step, (C) is required to obviate carageenan gum instability and breakdown which tends to occur at the high sterilization temperature and low pH condition of the gel composition caused by the acids added for flavor and the presence of the fruit particles. It has been found that the dessert mix can be rotated in water at a temperature of about 105° F., which is close to the approximate gelling point of the system without breaking the gel if it is done quickly and continuously. Preferably, the total elapsed time for cooling the dessert mix from its sterilizing temperature of 185° F. down to the desired temperature of 105° to 115° F., preferably 110° to 115° F., is from 7 to 25 minutes when using 105° F. cooling water. Initially, at this temperature, the mix attains a viscosity and/or weak gel structure which will immobilize the fruit pieces. The gel structure is not adversely affected by rotation at the time it initially reaches this temperature. However, about 15 minutes after reaching the gelling temperature, the mix gel structure develops to the extent that it can be broken by further rotation or rough handling. Therefore, the containers having the gel mix have to be quickly fed through the labeler and into an environment where the containers can be held without any agitation while going through the formation of the final gel in step E. This step takes about 24 hours before the gel will be able to stand further handling.

Therefore, in one aspect, the invention includes the discovery that there is a narrow sensitive temperature and time range in which a satisfactory gel dessert with uniform fruit distribution can be obtained. If the gel is not chilled enough it will not have the viscosity and/or structure to uniformly suspend the fruit pieces. If the gel is chilled past the desired temperature range or agitated after the critical time range, a breaking of the gel structure will occur and an unacceptable product will be produced.

Another important factor in this invention is the temperature of the chilling medium. The temperature of the cooling water in the final stages of cooling (Step D) is very critical. An unusual feature of this invention is the use of relatively warm water, e.g., 100° to 110° F. for the final chilling. The critical feature of this invention is to get all of the gel cooled to 105° to 115° F. without allowing the container walls to be chilled below about 100° to 110° F. If the container wall is chilled below about 100° F. gelling will start along the container walls. This will have two detrimental effects:

A. A slow down in heat transfer.

B. A formation of gel on container walls and no gelling in center core.

The formation of a gel on the container walls in step D results in an unacceptable gel structure after final cooling in step E. What results is a gel structure where the outer gel and inner core gel will not be joined together so that the consumer will not obtain the desired continuous gel, but rather a fractured gel.

When the gel is cooled properly and uniformly to the desired preferred average temperature of about 110° to 115° F., the gel mixture structure becomes such that the fruit will not sink or float, but rather maintain the uniform distribution produced by the spinning during cooling.

If this desired structure is not obtained due to undercooling, the fruit will sink or float, depending upon its specific gravity. This would result in non-uniform distribution of all the fruit into the top or bottom of the container in Step E.

By "rapid cooling" as referred to in step (C) above, is meant cooling from the sterilization temperature to the temperature range of 140° to 155° F. within 2 to 5 minutes, preferably 2 to 3 minutes. The cooling can be carried out in any convenient manner, e.g., in a spin cooling unit using a liquid, preferably water as the cooling medium. The cooling in steps (C) and (D) is best accomplished with water in the range of 100° to 110° F., preferably 105° F. The temperature of the cooling medium is preferably from 5° to 10° F. lower than the average gel temperature during the final stages of cooling the gel mix in steps (C) and (D). With this temperature water and about 7 to 15 minutes of spinning the gel mix will become thick enough to give uniform fruit distribution in the desserts containing fruit. The fruit will not change position. The desirable temperatures in the can appear to be 125° F. center temperature and 110° to 115° F. average temperature.

It has be found that any packaging container of reasonable dimension can be employed consistant with commercial custom. However, it is preferred to employ a packaging container of ratio of length to diameter of from 1:1 to 2:1 in order to achieve the most optimum results with regard to uniformity of the fruit particles within the gel. Although not essential, it is preferred to use a container of metallic structure so as to obtain the most efficient heat transfer from the cooling medium to the gel.

The present invention is applicable to all those fruits which are commonly canned, such as apples, pears, cherries, peaches, apricots, strawberries, rasberries, blueberries, blackberries, grapes, pineapples, grapefruit, oranges and the like. An additional step in the process is used for fruits whose specific gravity varies from the specific gravity of the gel. If the specific gravity of fruit is less than that of the gel as in mandarin oranges, the fruit specific gravity is raised by suitable manner, such as by treating the fruit with extra sugar. If the specific gravity of the fruit is higher than the gel as in the case of frozen strawberries, some of the sugar may be leached out.

The rotation of the packaging container is most simply directed about the longitudinal axis. Although many methods of carrying out the rotation step will readily suggest themselves to those skilled in the art, it has been found that a particularly convenient method is to roll the cans longitudinally on a track. The speed on the track should be such that the agitation is adequate to keep the fruit in suspension. For a container diameter of 3 inches, the conveying speed should be such that the cans go through about 60–80 revolutions per minute. In a preferred embodiment, the track does not move, but rather the containers are conveyed along or on the track. If the rotation is carried out for too long a period of time gelling will set in and breakage of the gel structure will result. It has been found that the optimum time of spinning depends on the manner of cooling. If the cooling of the container is effected with water at a temperature of about 105° F., the time of rotation should be about 7 to 15 minutes.

The gelling system employed herein is a combination of locust bean gum, a potassium sensitive carrageenan, i.e., kappa carrageenan in the presence of added potassium cations and a calcium sensitive carrageenan, i.e., iota carrageenan in the presence of added calcium cations. Calcium carrageenan is an ester of a polymerized galactose derived from, for example, red algae *Eucheuma spinosum* having reactive sulfate sites. The potassium carrageenan used in the practice of this invention is derived by extraction from, for example, the sea plant, *Chondrus crispus*, using mildly basic conditions followed by reduction of the extracted carrageenan and removal of water. The locust bean gum is conventionally obtained as an extract from the carob tree and should be clarified. The components of the gelling agent are all readily commercially available. The table immediately below sets forth illustrative and preferred weight percents of the components of the gelling system used in the instant invention based on the total weight of the dessert mix.

| | Preferred Range | Illustrative Range |
|---|---|---|
| Potassium Sensitive-Kappa Carrageenan | 0.23–0.27% | 0.1–0.6% |
| Calcium Sensitive-Iota Carrageenan | 0.40–0.47% | 0.1–0.5% |
| Clarified Locust Bean Gum | 0.17–0.20% | 0.0–0.4% |
| Potassium Citrate (also acts as buffer) | 0.19–0.21% | 0.15–0.25% |
| Calcium Cations (as salt) | 0.04–0.05% | 0.0–0.1% |
| Potassium Cations (as salt) (could be used in addition to pot. citrate) | not used | 0.05–0.15% |

The dessert gel prepared based on the above gelling agent system uniquely lends itself towards the facilitation of a product with uniform fruit distribution within the gel when used in conjunction with the process herein described. It has been found that although suitable gel desserts can be made with components of the gelling system used in amounts shown in the "illustrative" range in the above table, the nature of the end product may be slightly modified from that obtained when the amounts used are in the "Preferred" range. For example, if the locust bean gum is omitted, the texture of the gel may be adversely effected, and the gelling temperature range sensitivity increases. Additionally, as the amount of potassium sensitive carrageenan and potassium salts used in the composition is increased, the more rigid the gel tends to become, which may result in poor consumer acceptability.

The added calcium cations can be supplied by any non-toxic soluble calcium salt, such as calcium sulfate, calcium chloride, calcium lactate, calcium phosphate and the like. The added potassium cations can be supplied in the form of any soluble non-toxic potassium salt, such as potassium citrate, potassium chloride, potassium phosphate and the like. Moreover, as the moisture content of the fruit increases, e.g., as in the case of mandarin oranges, the amount of carrageenan to be used should be in the upper end of the range shown.

The amount of fruit concentrate necessary to obtain a suitable consumer product of this type is well known and governed by flavor and other practical considerations. However, the purposes of illustration, from 5 to 50 percent of the fruit concentrate or juice by weight of the total ingredients other than water can be employed.

When pH adjustment is necessary, it can be most effectively accomplished by the use of common food agents, such as citric, adipic, ascorbic and the like. Sugar, advantageously in the form of granulated white sugar, or artificial sweeteners, can be included as sweeteners in suitable quantities as required. Other ingredients can be included to enhance the nutritional value, such as riboflaven, niacin, thiamin and the like.

In addition to the above advantages, it has been found that the labeling and subsequent storage of the packaged containers prior to shipping is greatly facilitated by the instant process. The gel temperature of 105° to 115° F., required in step (D) of the process, fortuitously results in an outside container temperature which is ideal for quickly self-drying the cans by evaporation after going through conventional cooling equipment, e.g., spin conveyors during the interval of time they are being transferred to the labeler. The cans can then be immediately labeled and after a suitable time in the cases, the gel dessert is ready for shipping.

As the length to diameter ratio of the container decreases outside the above set forth limits, the tendency of the fruit particles to sink or float within the gel, has the effect of causing the fruit particle distribution to be relatively uniform. However, containers of these dimensions are not preferred since these cans are more difficult to cool, therefore necessitating the use of more drastic cooling measures, such as a cooling canal. When the more severe cooling conditions are employed, the outside container temperature is not sufficiently high so as to self-dry the containers and supplementary drying means, e.g., a can dryer must be employed before the labeling operation. The heat from the drying step at this stage in the process tends to result in melting the gel on the sides and the walls of the can causing gel breakdown during the labeling process due to the fact that the melted gel on the outer layer does not adhere to the gel core.

The processes of the instant invention are uniquely adapted to gel desserts containing fruit particles. However, other advantages are also obtained when used for the preparation of gel desserts which have no particles of fruit therein. Thus, plain gel desserts can be chilled in colder, for instance, 70° F. water without rotation to obtain a satisfactory gel. However, when chilled in this way, they cannot be put through the labeling machine in hot condition so as to obtain dry cans due to the fact that the outside of the can is not hot enough to dry itself. Further, the chilling operation must be conducted for a long enough period of time to completely set the gel so as to obviate breakdown in going through the labeling machine. Alternatively, if the can is completely chilled before going through the labeling and casing line, a hot air can dryer or equivalent is required to dry the container. The hot air tends to soften the gel along the wall and end of the can leading to gel breakdown while going through the labeling and casing machinery.

The following are illustrative examples of the formulation, in parts by weight of the constituents, for making the dessert in accordance with this invention.

EXAMPLE 1

The following is a formula for mandarin orange gel dessert to illustrate the composition of a typical formula:

| | | |
|---|---|---|
| Sucrose | 112.6 | lbs. |
| Potassium Citrate | 2.12 | " |
| Citric Acid | 5.28 | " |
| Calcium Sensitive Carrageenan product | 4.93 | " |
| Potassium Sensitive Carrageenan and Locust Bean Gum Combination | 4.93 | " |
| Calcium Sulfate | 0.42 | " |
| Sodium Citrate | 1.69 | " |
| Imit. Orange Flavor | 0.14 | " |
| Artificial Color | 0.013 | " |
| Canned Mandarin Oranges | 198.9 | " |
| Water | 668.9 | " |

To adjust the specific gravity of the oranges 3.3 to 5.2 lbs. of sugar, depending upon the specific gravity of the syrup in the can, is added to the syrup from the canned Mandarin Oranges. After a soaking period the orange pieces will arrive at a specific gravity to give a good distribution in the gel dessert when the gel dessert is processec according to the hereinabove described process.

EXAMPLE 2

Lemon Flavored Fruit Cocktail approximately 100 lb. batch.

| | | |
|---|---|---|
| 1. Sucrose (flavoring) | 10.6 | lbs. |
| 2. Potassium citrate | 0.19 | " |
| 3. Citric acid (flavoring) | 0.47 | " |
| 4. Calcium sensitive carrageenan product | 0.39 | " |
| 5. Potassium sensitive carrageenan & locust bean gum combination product | 0.44 | " |
| 6. Potassium sensitive carrageenan product | 0.04 | " |
| 7. Calcium sulfate | 0.04 | " |
| 8. Sodium citrate (buffering) | 0.15 | " |
| 9. Lemon color | 0.004 | " |
| 10. Lemon flavor | 0.014 | " |
| 11. Canned fruit cocktail in heavy syrup | 22.9 | " |
| 12. Water | 65.0 | " |

A. The dry powdered ingredients No. 1 – 9 are thoroughly mixed in a mixer such as a ribbon blender. This step aids in dispersing the carrageenans into the water.

B. The syrup is drained from the canned Fruit Cocktail. If the brix of the syrup from the fruit cocktail is 18.0 to 18.5, no fruit treatment or formula adjustment is needed.

C. The water and fruit cocktail syrup are heated to about 185° F.

D. The dry, well-mixed ingredients are then carefully sifted into the water with vigorous agitation, but with a minimum incorporation of air.

The temperature of the mixture will drop to about 170° F. at this point. The lemon flavor is added at this point.

E. The drained fruit cocktail is filed into 300 × 407 (3 inch diameter and 4 7/16 inches high) cans with a target weight of about 72 grams per can. The hot gel mix is then filled into the cans to give a total weight per can of 16 to 16 ⅝ ounces. The cans are then passed through a Steam-Vac unit and the cans are sealed. The temperature in the cans at this time should be about 150° F.

F. The cans are then held in 190° F. water for 10 minutes to sterilize the contents. At the end of this period the cans are inverted and held for one minute.

G. The cans are then passed through a spin cooling unit where they are continuously rotated on their sides using water at 105° F. to cool them. The cooling is continued until the average can temperature comes to 110° to 115° F.

At this temperature the gel becomes thick enough to maintain the uniform fruit distribution brought about by the spinning. At the same time chilling the cans with about 105° F. water stops gel formation on the sides and the ends of the cans. Such gel formation if colder chilling water was used would result in a layer of gelled dessert which would separate from the remainder of the dessert when it was removed from the can.

We claim:

1. A process for preparing a gelled composition which comprises the steps of:

A. packaging a dessert mix comprising water, particles of fruit and a gelling agent comprising 0.1 to 0.6 percent potassium sensitive carrageenan; 0.1 to 0.5 percent calcium sensitive carrageenan; 0.0 to 0.4 percent locust bean gum; 0.0 to 0.1 percent non-toxic calcium salt; and 0.15 to 0.25 percent non-toxic potassium salt based on the total weight of the dessert mix in a container and sealing said container;

B. heating the packaged dessert mix to a sterilizing temperature for sufficient time to effect sterilization;

C. cooling said dessert mix to a temperature of about 140° to 155° F. within 2 to 5 minutes while concurrently rotating the container;

D. further cooling said dessert mixture to a temperature of about 105° to 115° F. while concurrently rotating the container for a sufficient time to cause the rotating gel mix to become viscous enough or so structured so that there is no relative movement or change in position of the fruit particles with respect to each other in a gel without allowing the container walls to be chilled below about 100° to 110° F.; and E. still further cooling the dessert mix to a temperature below the gel point while the container is in substantially stationary condition.

2. The process of claim 1, wherein the container is passed through a labeling machine subsequent to step (D) and prior to step (E).

3. The process of claim 1, wherein the packaging container is of a ratio of length to diameter of from 1:1 to 2:1.

4. The process of claim 1, wherein the specific gravity of the fruit is adjusted so as to be substantially the same as that of the gel.

5. The process of claim 1, wherein the temperature of the cooling medium used in steps (C) and (D) is 5° to 10° F. lower than the average gel temperature during the final stages of cooling the gel mix in steps (C) and (D).

6. The process of claim 5, wherein the total elapsed time for cooling the dessert mix in steps (C) and (D) is from 7 to 25 minutes.

7. The process of claim 1, wherein the cooling medium employed in steps (C) and (D) is water having a temperature range from 100° to 110° F.

8. In a process for the preparation of a sterilized packaged dessert gel composition containing fruit particles, and a gelling agent comprising 0.1 to 0.6 percent potassium sensitive carrageenan; 0.1 to 0.5 percent calcium sensitive carrageenan; 0.0 to 0.4 percent locust bean gum; 0.0 to 0.1 percent non-toxic calcium salt; and 0.15 to 0.25 percent non-toxic potassium salt based on the total weight of the dessert gel composition and fruit particles, the improvement which comprises cooling the package from the sterilization temperature to a temperature of about 105° to 115° F., the cooling from the sterilization temperature to a temperature range of 148° to 155° F. taking placed within 2 to 5 minutes while concurrently rotating the packaging container along its longitudinal axis for a sufficient time to cause the rotating gel mix to become viscous enough so that there is no relative movement of the fruit particles with respect to each other in the gel without allowing the container walls to be chilled below about 100° to 110° F.

* * * * *